(12) United States Patent
Masuda et al.

(10) Patent No.: US 10,097,424 B2
(45) Date of Patent: Oct. 9, 2018

(54) ROUTE DISPLAY METHOD AND ROUTE DISPLAY APPARATUS

(71) Applicant: FUJITSU LIMITED, Kawasaki-shi, Kanagawa (JP)

(72) Inventors: Kazuki Masuda, Yokohama (JP); Nobumitsu Ishiwatari, Kawasaki (JP); Mitsumasa Matsuike, Kawasaki (JP); Shinichirou Wada, Hiroshima (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/061,242

(22) Filed: Mar. 4, 2016

(65) Prior Publication Data

US 2016/0294638 A1 Oct. 6, 2016

(30) Foreign Application Priority Data

Mar. 31, 2015 (JP) .................. 2015-073250

(51) Int. Cl.
*H04L 12/24* (2006.01)
*H04L 12/46* (2006.01)
*H04L 12/12* (2006.01)

(52) U.S. Cl.
CPC .............. *H04L 41/22* (2013.01); *H04L 12/12* (2013.01); *H04L 12/4641* (2013.01); *H04L 41/12* (2013.01); *Y02D 50/40* (2018.01)

(58) Field of Classification Search
CPC ..... H04L 12/12; H04L 12/1641; H04L 41/12; H04L 12/22; H04L 12/0873
See application file for complete search history.

(56) References Cited

U.S. PATENT DOCUMENTS

| 2005/0270986 | A1* | 12/2005 | Watanabe | H04L 41/12 370/252 |
| 2009/0194675 | A1* | 8/2009 | Ichino | H04B 10/6911 250/214 R |
| 2009/0207756 | A1* | 8/2009 | Sakai | H04L 41/0873 370/254 |

FOREIGN PATENT DOCUMENTS

| JP | 2005-348051 | 12/2005 |
| JP | 2009-194675 | 8/2009 |

OTHER PUBLICATIONS

Extended European Search Report dated Jul. 28, 2016 in corresponding European Patent Application No. 16158679.7.
European Examination Report dated Aug. 2, 2017 in corresponding European Patent Application No. 16158679.7.
Office Action dated Jan. 29, 2018 in corresponding European Patent Application No. 16 158 679.7, 7 pp.

\* cited by examiner

*Primary Examiner* — Mewale Ambaye
(74) *Attorney, Agent, or Firm* — Staas & Halsey LLP

(57) ABSTRACT

A route display method includes obtaining, by a processor, specification information that specifies one of interfaces from interfaces of an L2 apparatus that relays communication according to a protocol used in a datalink layer, among a plurality of apparatuses included in a virtual network displayed on a display apparatus, identifying, by the processor, an L3 apparatus that relays communication according to a protocol used in a network layer and belongs to a same network as the interface of the L2 apparatus, according to the specification information, and making, by the processor, a route that connects between the L2 apparatus and the L3 apparatus displayed on the display apparatus.

3 Claims, 12 Drawing Sheets

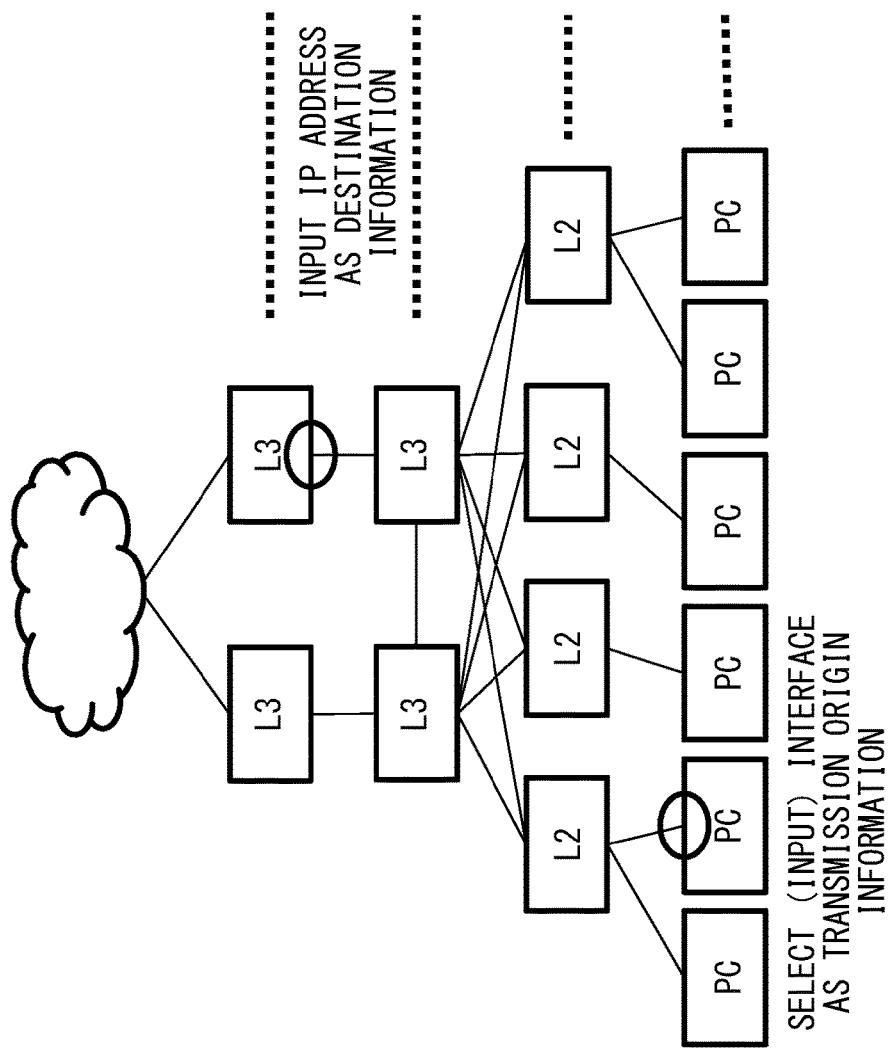
F I G. 1

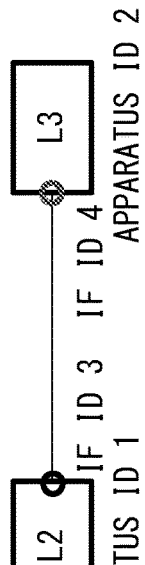
F I G. 7A
IF ID 1　　IF ID 3　IF ID 4
IF ID 2
APPARATUS ID 1　APPARATUS ID 2
F I G. 7B
INTERFACE TABLE ~37
| IF ID | APPARATUS ID | VLAN ID |
|---|---|---|
| 1 | 1 | 2 |
| 2 | 1 | 3 |
| 3 | 1 | 2, 3 |
| 4 | 2 | 2, 3 |
F I G. 7C
APPARATUS TABLE ~38
| APPARATUS ID | APPARATUS TYPE |
|---|---|
| 1 | L2 |
| 2 | L3 |
F I G. 7D
CONNECTION LINE TABLE ~39
| CONNECTION LINE ID | ORIGIN APPARATUS ID | ORIGIN IF ID | DESTINATION APPARATUS ID | DESTINATION IF ID |
|---|---|---|---|---|
| 1 | 1 | 3 | 2 | 4 |

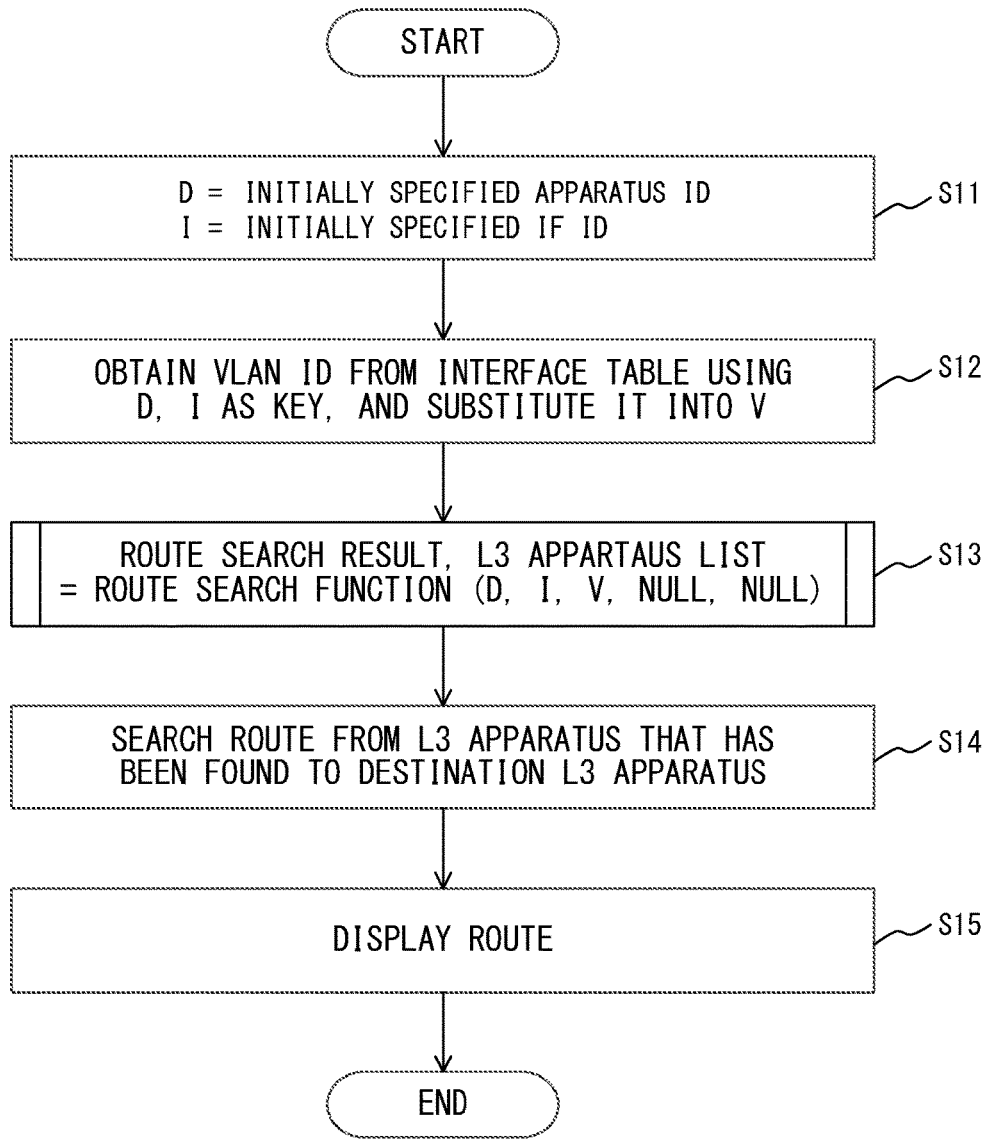
F I G. 9

ROUTE DISPLAY METHOD AND ROUTE DISPLAY APPARATUS

CROSS-REFERENCE TO RELATED APPLICATIONS

This application is based upon and claims the benefit of priority of the prior Japanese Patent Application No. 2015-073250, filed on Mar. 31, 2015, the entire contents of which are incorporated herein by reference.

FIELD

The embodiments discussed herein are related to a route display method, a route display program, and a route display apparatus.

BACKGROUND

The Software Defined Network (SDN) technology is a technology with which, on a physically connected network, a network is built virtually. The SDN technology is realized by software by OpenFlow that is a technique for controlling network apparatuses, or the like. The SDN technology builds a network virtually, and therefore, it becomes possible to build a network flexibly according to the purpose. Software that uses this SDN technology is equipped with a function with which the user selects arbitrary two points from the control screen and a route between two points is displayed.

It is assumed that this function is applied to a network that is configured in a complicated manner by Virtual Local Area Network (VLAN), Virtual Routing and Forwarding (VRF), or the like. Then, the route used at the time of communication is understood, and also, when a failure occurs, the problem is visualized, making the failure analysis easy.

As the techniques for managing the configuration of a network, there are following techniques.

As a first technique, for example, there is a technique with which the network configuration is detected and a drawing that represents the network configuration is created (for example, Patent document 1).

As a second technique, for example, there is a technique with which, while associating the topologies of the lower layer and the higher layer of the network, the topology between a plurality of apparatuses is searched (for example, Patent document 2).

Patent document 1: Japanese Laid-open Patent Publication No. 2009-194675

Patent document 2: Japanese Laid-open Patent Publication No. 2005-348051

SUMMARY

According to an aspect of the embodiment, a route display method includes obtaining, by a processor, specification information that specifies one of interfaces from interfaces of an L2 apparatus that relays communication according to a protocol used in a datalink layer, among a plurality of apparatuses included in a virtual network displayed on a display apparatus, identifying, by the processor, an L3 apparatus that relays communication according to a protocol used in a network layer and belongs to a same network as the interface of the L2 apparatus, according to the specification information, and making, by the processor, a route that connects between the L2 apparatus and the L3 apparatus displayed on the display apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is an example of a network configuration diagram displayed on the screen of an SDN controller;

FIGS. 7A-7D present a model of an interface between apparatuses and tables provided in an SDN controller in an example of the present embodiment;

FIG. 9 illustrates the flow of a route display process in an example of the present embodiment;

DESCRIPTION OF EMBODIMENTS

Figure 2:
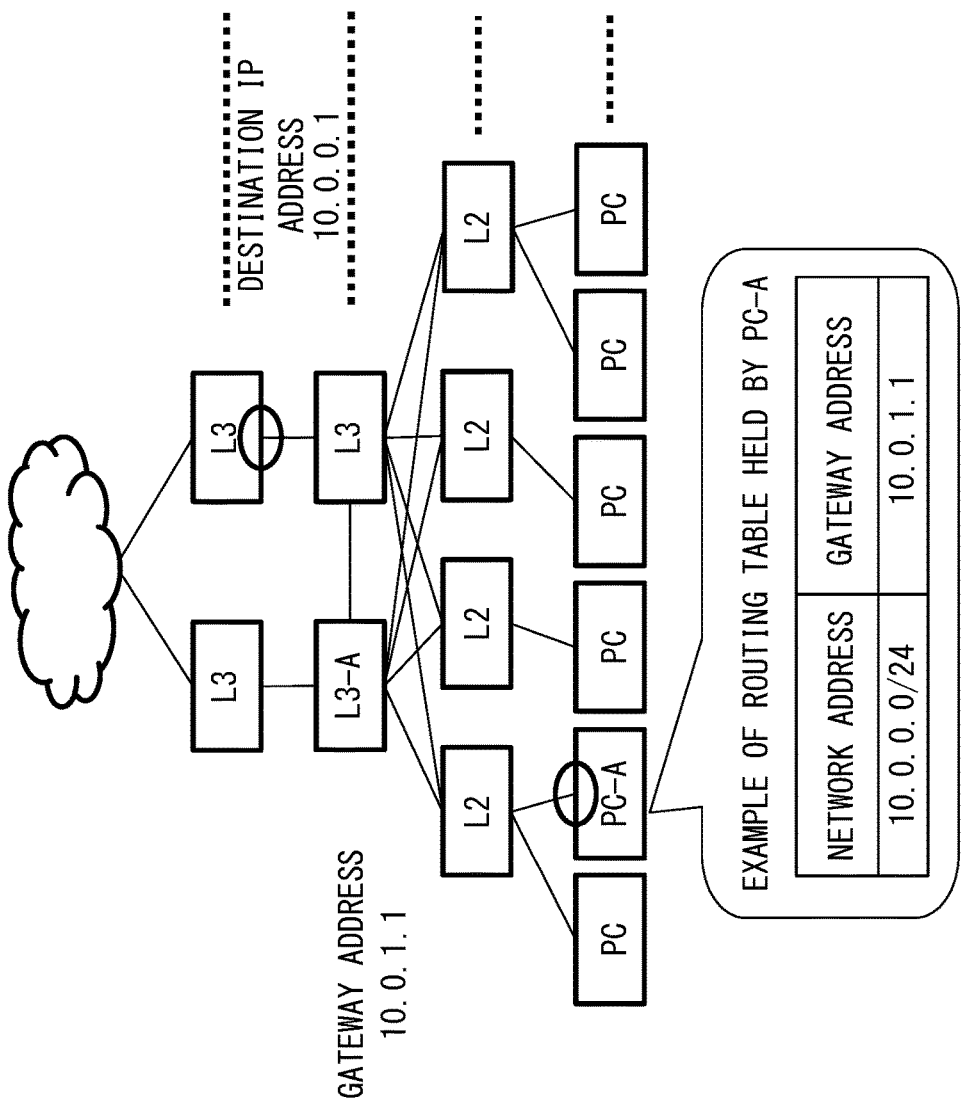
FIG. 2 is a diagram for explaining a route display function of an SDN controller.

The management and control of a virtual network realized by the SDN technology are performed by an SDN controller. The SDN controller is able to make a configuration diagram of a network that virtually represents the physically connected network displayed on the screen. With respect to this network configuration diagram, the user may select arbitrary two points (a first point, a second point) from the screen, and the route between the points may be displayed.

However, in the case of a large-scale network, the number of the apparatuses becomes enormous. If all these apparatuses were to be displayed on a single screen, there is a limit in terms of the screen size, or the registration becomes troublesome, and apparatuses at the end may not be displayed on the screen in some cases. In this case, selection of an interface of the apparatus at the end as the first point is unavailable.

Then, it seems possible to select an interface of the layer (L)2 apparatus connected to such an apparatus that is not displayed and to make the route from the L2 apparatus to the second point displayed.

However, the L2 apparatus is not able to recognize the gateway address of the network to which the L2 apparatus itself belongs, and therefore, it is not able to determine the L3 apparatus that is the forwarding destination in checking the communication route with a different network.

FIG. 1 is an example of a network configuration diagram displayed on the screen of an SDN controller. It is assumed that the network configuration diagram illustrated in FIG. 1 is displayed on the screen of a display apparatus of the SDN controller.

In the network configuration diagram, "PC" represents a computer such as a server, a user terminal, or the like. "L2" represents a layer (L)2 apparatus that relays the communication according to a protocol corresponding to L2 (the datalink layer) in the Open Systems Interconnection (OSI) reference model. "L3" represents a layer (L)3 apparatus that relays the communication according to a protocol corresponding to L3 in the OSI reference model. The indication that appears like a cloud in the network configuration diagram is a symbol that indicates that a part of the network is omitted in the display.

When the user selects arbitrary two points on the screen and a route between the two points is to be displayed on the screen, one of the two points is assumed as the search origin for the route and the other is assumed as the destination. At this time, the user selects (inputs) the interface (for example, a port) of the apparatus that is the search origin on the screen, as search origin information for the route. In addition, the user inputs the Internet Protocol (IP) address of the destination apparatus on the screen as destination information, using an input apparatus.

Here, the apparatus selected as the search origin is able to handle L3 information. Accordingly, the SDN controller is able to identify the next L3 apparatus for the search origin apparatus by referring to the gateway address corresponding to the destination IP address from the routing table of the search origin apparatus. An explanation is provided about this, using FIG. 2.

FIG. 2 is a diagram for explaining the route display function of the SDN controller. It is assumed that a computer PC-A has been selected as the search origin. It is assumed that PC-A has the routing table illustrated in FIG. 2, for example.

When a route search is performed by the SDN controller, the SDN controller accesses PC-A, refers to the routing table of PC-A and detects that the gateway address is "10.0.1.1 (L3-A)". Next, the SDN controller accesses the L3 apparatus that has the detected gateway address, and compares the routing table of the accessed apparatus and the destination IP address to detect the next gateway address. The SDN controller performs the route search by sequentially detecting the gateway addresses in this way.

As described above, the SDN controller determines the forwarding-target L3 apparatus according to the gateway address set in the selected interface. Meanwhile, hereinafter, an interface may be referred to as an "IF" in some cases. In addition, hereinafter, identification information may be referred to as an "ID" in some cases.

However, in the case of a large-scale network, the number of the apparatuses becomes enormous. If all these apparatuses were to be displayed on a single screen, the troublesomeness would make the management difficult. The apparatuses at the end (the PC, server) are more significantly susceptible to the influence. Therefore, although the SDN controller is still able to manage the apparatuses at the end, it purposely does not manage them, in order to avoid making the number of apparatuses enormous. In this case, the apparatuses at the end are not displayed on the screen. For this reason, while the apparatuses (the PC, server) at the end are still the management targets of the SDN controller, they are not displayed on the screen.

Figure 3:
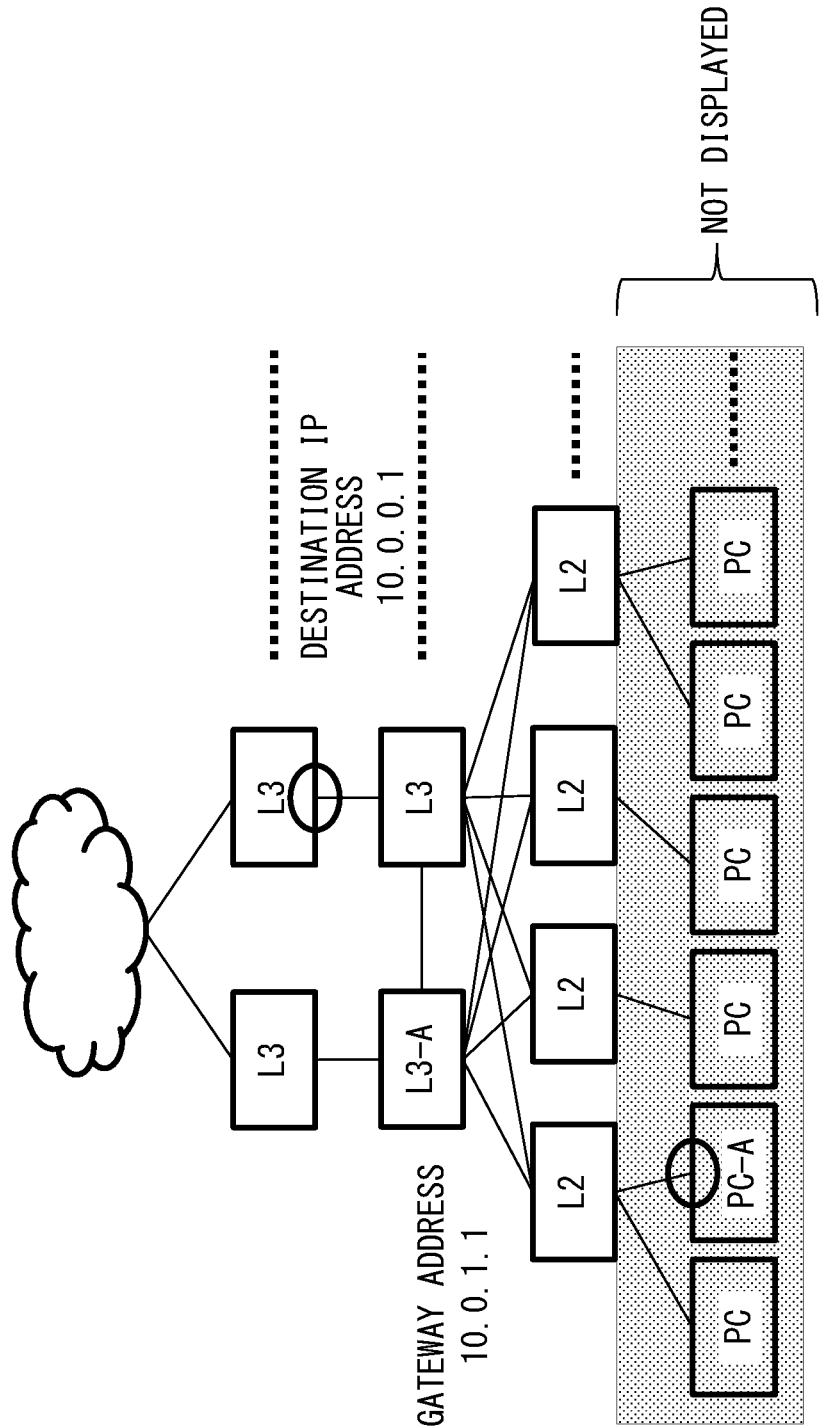
FIG. 3 is a diagram for explaining that, when there are a large number of apparatuses, the apparatuses at the end are not displayed.

FIG. 3 is a diagram for explaining that, when there is a large number of apparatuses, the apparatuses at the end are not displayed. In FIG. 3, the shades on the apparatuses at the end indicate that they are not displayed on the screen due to the large number of the apparatuses.

For this reason, it becomes impossible for the user to select the apparatuses at the end on the screen, and it becomes impossible to display a route whose origin is an apparatus at the end.

Then, in this embodiment, instead of the display of a route from an apparatus at the end, the following SDN controller is explained. That is, an explanation is provided for an SDN controller that displays a route indication for which routing is performed from an L2 apparatus connected to an apparatus at the end that is not displayed on the screen, by selecting the interface of the L2 apparatus connected to the apparatus at the end.

First, the L2 apparatus does not has any routing table. For this reason, only with the destination IP address, the SDN controller is not able to identify the L3 apparatus that has the gateway address of the network to which the L2 apparatus belongs.

Then, the SDN controller identifies the L3 apparatus that has the gateway address of the network to which the L2 apparatus belongs, according to information (L2 information) of VLAN to which the interface selected as the input belongs.

When the L3 apparatus is identified, the SDN controller accesses the identified L3 apparatus, refers to the routing table of the L3 apparatus, and compares the destination IP address and the routing table to identify the subsequent forwarding destination.

However, in the present embodiment, the L3 apparatus that has the gateway address is not uniquely determined, and all the L3 apparatuses that belong to the same VLAN are found out. Therefore, an L3 apparatus that is irrelevant to the route that is actually used may be found out in some cases, but the L3 apparatus that the route actually goes through is always discovered. By using the method described above, the problem is solved in which it is impossible to find the L3 apparatus that is the forwarding destination because the L2 apparatus is not able to handle the IP address.

The present embodiment is explained below.

Figure 4:
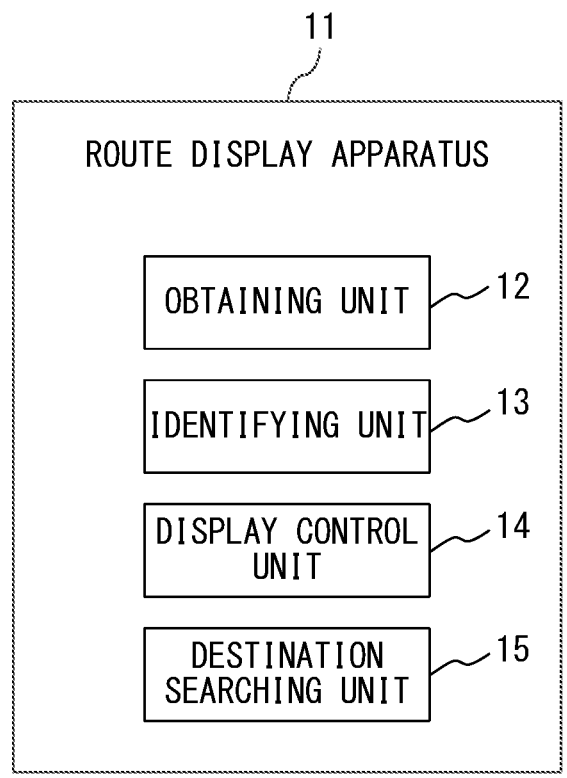
FIG. 4 illustrates a route display apparatus in the present embodiment.

FIG. 4 illustrates a route display apparatus in the present embodiment. A route display apparatus 11 includes an obtaining unit 12, an identifying unit 13, and a display control unit 14.

the obtaining unit 12 obtains specification information that specifies one of the interfaces of the L2 apparatus that relays the communication according to the protocol used in the datalink layer, among a plurality of apparatuses included in the virtual network displayed on the display apparatus. An example of the obtaining unit 12 is an input information obtaining unit 32 described later.

The identifying unit 13 identifies the L3 apparatus that relays the communication according to the protocol used in the network layer, according to the specification information. Here, this L3 apparatus is an L3 apparatus that belongs to the same network as for the interface of the L2 apparatus. An example of the identifying unit 13 is an L3 apparatus identifying unit 33 described later.

The display control unit 14 displays the route that connects between the L2 apparatus and the L3 apparatus. An example of the display control unit 14 is the display control unit 35 described later.

By making the configuration as described above, it is made possible to display a route from an L2 apparatus that is connected to an apparatus that is not selectable, in displaying of a virtualized network configuration.

The identifying unit 13 identifies the interface that belongs to the same network as the one to which the specified interface belongs, according to network information that indicates the networks to which the interfaces of a plurality of apparatuses belong to. The identifying unit 13 identifies the apparatus connected to the identified interface, according to connection information between the plurality of apparatuses. The identifying unit 13 further determines whether the identified apparatus is an L3 apparatus, according to type information for the plurality of apparatuses.

By making the configuration as described above, a L3 apparatus that belongs to the same network as the interface of the L2 apparatus may be identified.

The route display apparatus 11 further includes a destination searching unit 15. The destination searching unit 15 performs a search in the routing table of the L3 apparatus. At this time, the display control unit 14 further displays the route that connects between the L3 apparatus and the target L3 apparatus. An example of the destination searching unit 15 is a destination searching unit 34 described later.

By making the configuration as described above, the route that connects between the L2 apparatus and the target L3 apparatus may be displayed.

Hereinafter, an example of the present embodiment is explained.

Figure 5:
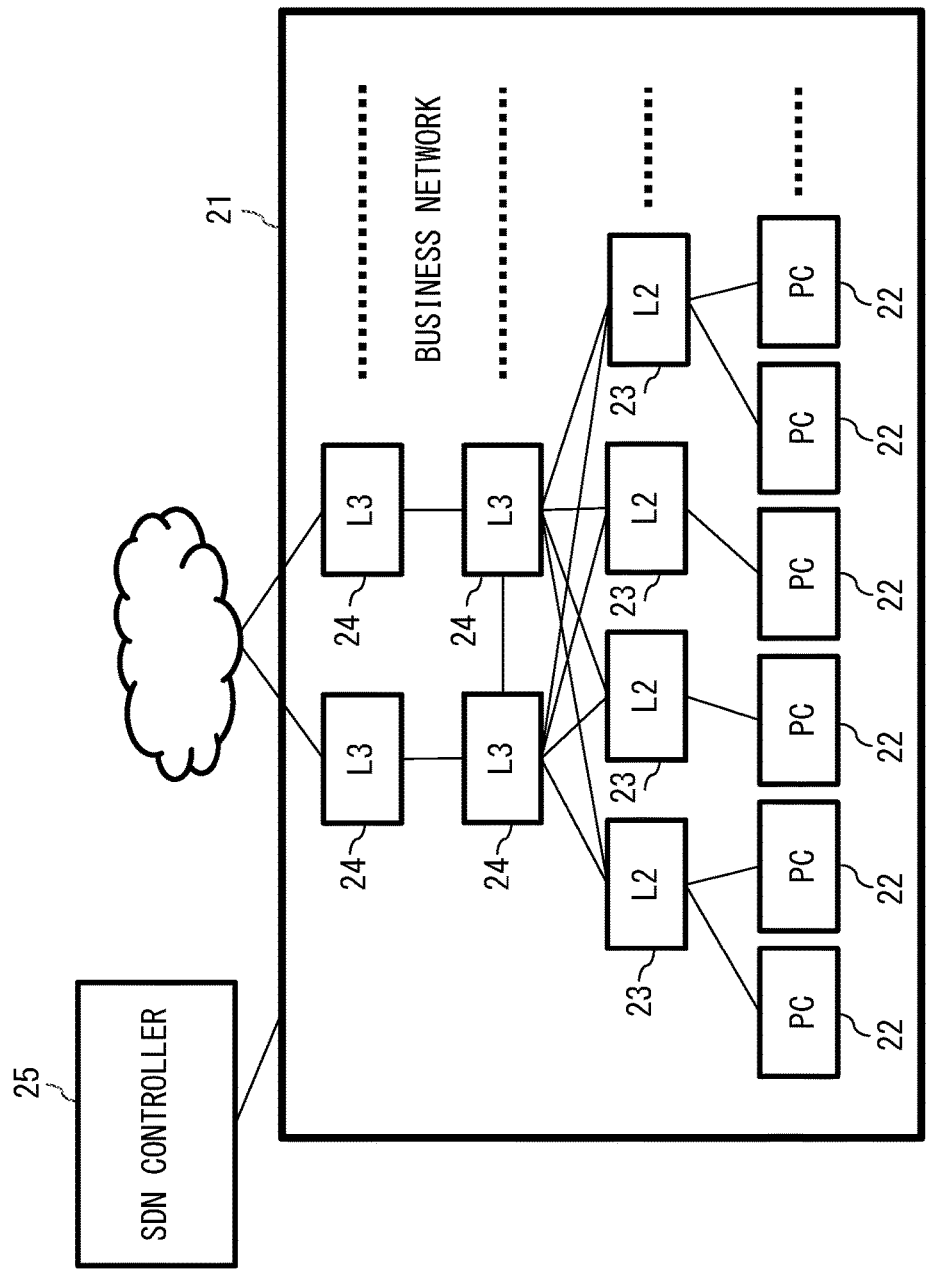
FIG. 5 is a diagram illustrating the overall configuration in an example of the present embodiment.

FIG. 5 is a diagram illustrating the overall configuration in an example of the present embodiment. An SDN controller 25 is connected to a business network 21 and manages the business network 21 as the management target. The business network 21 includes a PC 22, an L2 apparatus 23, and an L3 apparatus 24.

The PC 22 is a computer such as a server, a user terminal or the like. The L2 apparatus 23 is a relay apparatus that relays the communication according to the protocol used in the datalink layer. The L3 apparatus 24 is a relay apparatus that relays the communication according to the protocol used in the network layer.

According to the SDN technology, the SDN controller 25 performs route control on a network configuration diagram in which the business network 21 is virtualized, and together with this, it identifies the route by routing (a route search) and outputs the identified route on the display apparatus.

Figure 6:
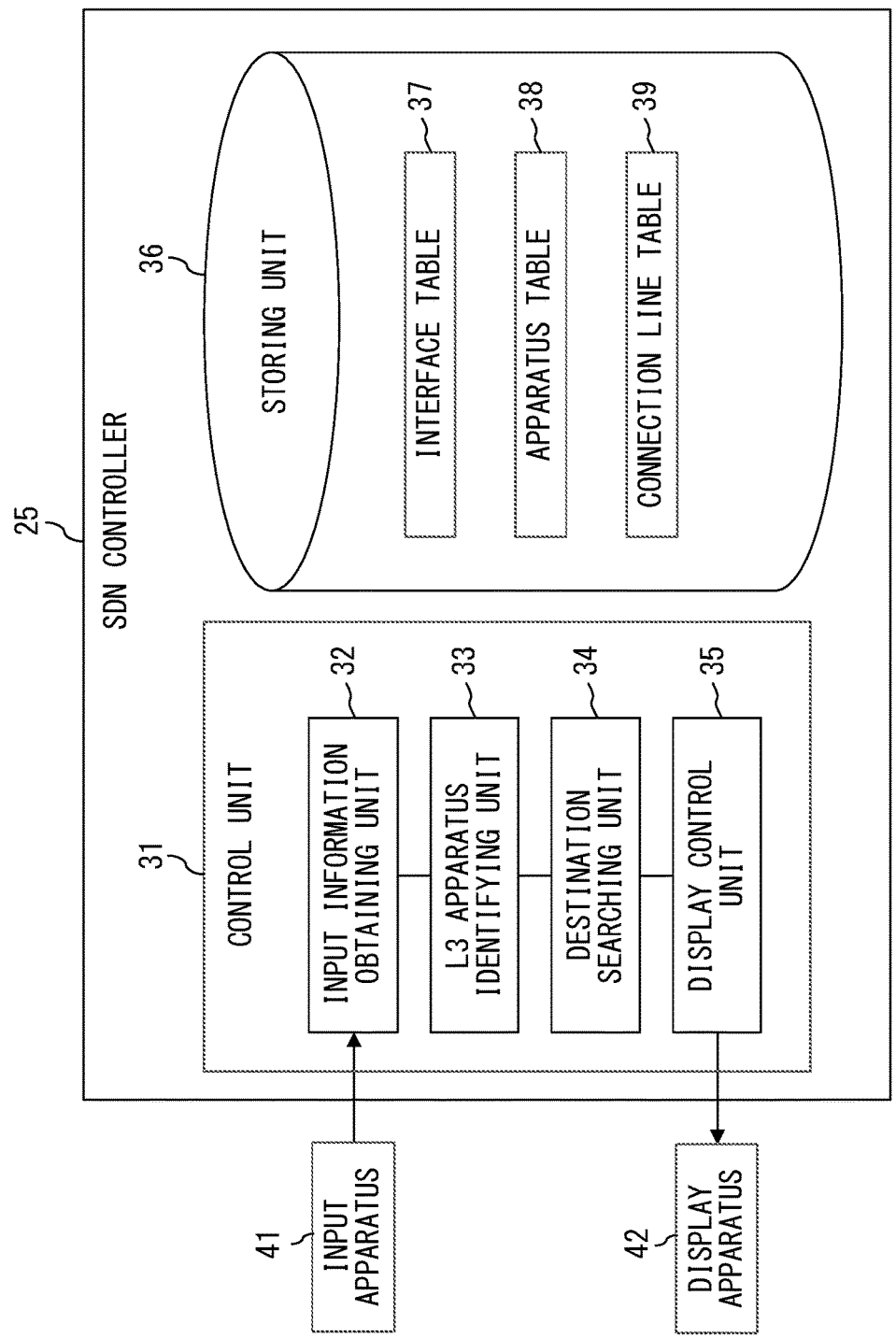
FIG. 6 is a block diagram of an SDN controller in an example of the present embodiment.

FIG. 6 is a block diagram of the SDN controller in an example of the present embodiment. The SDN controller 25 is connected to an input apparatus 41 and a display apparatus 42. The SDN controller 25 includes a control unit 31 and a storing unit 36.

A network configuration diagram is displayed on the display apparatus 42, for example. According to the operation of the user, the input apparatus 41 is able to specify one of the interfaces of the target L2 apparatus with respect to the network configuration diagram displayed on the display apparatus 42, and to input interface information as input information. In addition, according to the operation of the user, the input apparatus 41 is able to input the destination IP address with respect to the network configuration diagram displayed on the display apparatus 42.

The control unit 31 is a processor such as a central processing unit (CPU) or the like, and it controls the overall operations of the SDN controller 25. The control unit 31 functions as an input information obtaining unit 32, an L3 apparatus identifying unit 33, a destination searching unit 34, and an display control unit 35, by reading and executing the program according to the present embodiment from the storing unit 36.

The input information obtaining unit 32 obtains interface information (input information) of the L2 apparatus that the user has specified using the input apparatus 41. Meanwhile, the input information obtaining unit 32 obtains the destination IP address that the user has specified using the input apparatus 41.

The L3 apparatus identifying unit 33 identifies all the L3 apparatuses that belong to the network (VLAN) to which the L2 apparatus belongs, according to the interface information (input information) of the L2 apparatus.

The destination searching unit 34 accesses the identified L3 apparatus, refers to the routing table of the L3 and derives the address of the gateway from the destination IP address or the network address. That is, the destination searching unit 34 compares the routing table that has been referred to and the destination IP address or the network address, and detects the next gateway address. The SDN controller 25 sequentially detects gateway addresses, and searches for the route between the identified L3 apparatus and the destination L3 apparatus. Meanwhile, regarding the route from the identified L3 apparatus to the destination IP address, the search may be started after a prescribed request is received.

The display control unit 35 outputs the search result to the display apparatus 42. At this time, on the network configuration diagram displayed on the display apparatus 42, the display control unit 35 performs highlighted display for the searched route (the route from the specified L2 apparatus to the respective L3 apparatuses that have been identified, and the route from the respective L3 apparatuses to the apparatus indicated by the destination IP address).

The storing unit 36 includes an interface table 37, an apparatus table 38, and a connection line table 39. The interface table 37 is a table that manages which VLAN ID is set in the IF, regarding the relay apparatuses displayed on the network configuration diagram. The apparatus table 38 is a table that manages the types of the apparatuses for apparatus ID regarding the relay apparatuses displayed on the network configuration diagram. The connection line table 39 manages which IF ID of which apparatus ID is connected to which IF ID of which apparatus ID, regarding the relay apparatuses displayed on the network configuration diagram.

FIGS. 7A-7D present a model of an interface between apparatuses and tables provided in the SDN controller in an example of the present embodiment.

FIG. 7A presents a model of the correspondence relationship between the interfaces of apparatuses. For example, the L2 apparatus indicated by the apparatus ID=1 has an interface indicated by the IF ID=1, an interface indicated by the IF ID=2, and an interface indicated by the IF ID=3.

Meanwhile, for example, the L3 apparatus indicated by the apparatus ID=2 has an interface indicated by the IF ID=4. The interface indicated by the IF ID=3 and the interface indicated by the IF ID=4 are connected.

The contents of the interface table 37, the apparatus table 38, and the connection line table are based on the model in FIG. 7A. Meanwhile, the interface table 37, the apparatus table 38, and the connection line table 39 store information about the relay apparatuses such as the L2 apparatus, the L3 apparatus, and the like, and do not store information about apparatuses such as the server, the PC, and the like.

FIG. 7B presents an example of the interface table 37. The interface table 37 has data items "IF ID", "Apparatus ID", and "VLAN ID". "IF ID" stores the IF ID assigned uniquely to an interface of each apparatus in the business network that is the management target. "Apparatus ID" stores the apparatus ID assigned uniquely to each apparatus in the business network that is the management target. "VLAN ID" stores VLAN ID that identifies VLAN to which an interface of each apparatus belongs.

Meanwhile, a plurality of VLANs may be set for a single IF in some cases, but in the present embodiment, the IF that may be specified as the input is limited to the IF that has one VLAN ID.

FIG. 7C presents an example of the apparatus table 38. The apparatus table 38 includes data items "Apparatus ID" and "Apparatus Type". "Apparatus ID" stores the apparatus ID assigned uniquely to each apparatus in the business network 21 that is the management target. "Apparatus Type" stores the type of the apparatus.

For example, "Apparatus Type" identified by the Apparatus ID=1 stores "L2" that represents that it is an L2 apparatus. "Apparatus Type" identified by the Apparatus ID=2 stores "L3" that represents that it is an L3 apparatus.

FIG. 7D presents the connection line table. The connection line table 39 includes data items "Connection Line ID", "Origin Apparatus ID", "Origin IF ID", "Destination Apparatus ID", "Destination IF ID.

"Connection Line ID" stores the ID that identifies the connection line that connects between the apparatuses. "Origin Apparatus ID" stores the apparatus ID of the connection origin of the connection line. "Origin IF ID" stores the interface ID of the connection origin of the connection line.

"Destination Apparatus ID" stores the apparatus ID of the connection destination of the connection line. "Destination IF ID" stores the interface ID of the connection destination of the connection line.

Figure 8:
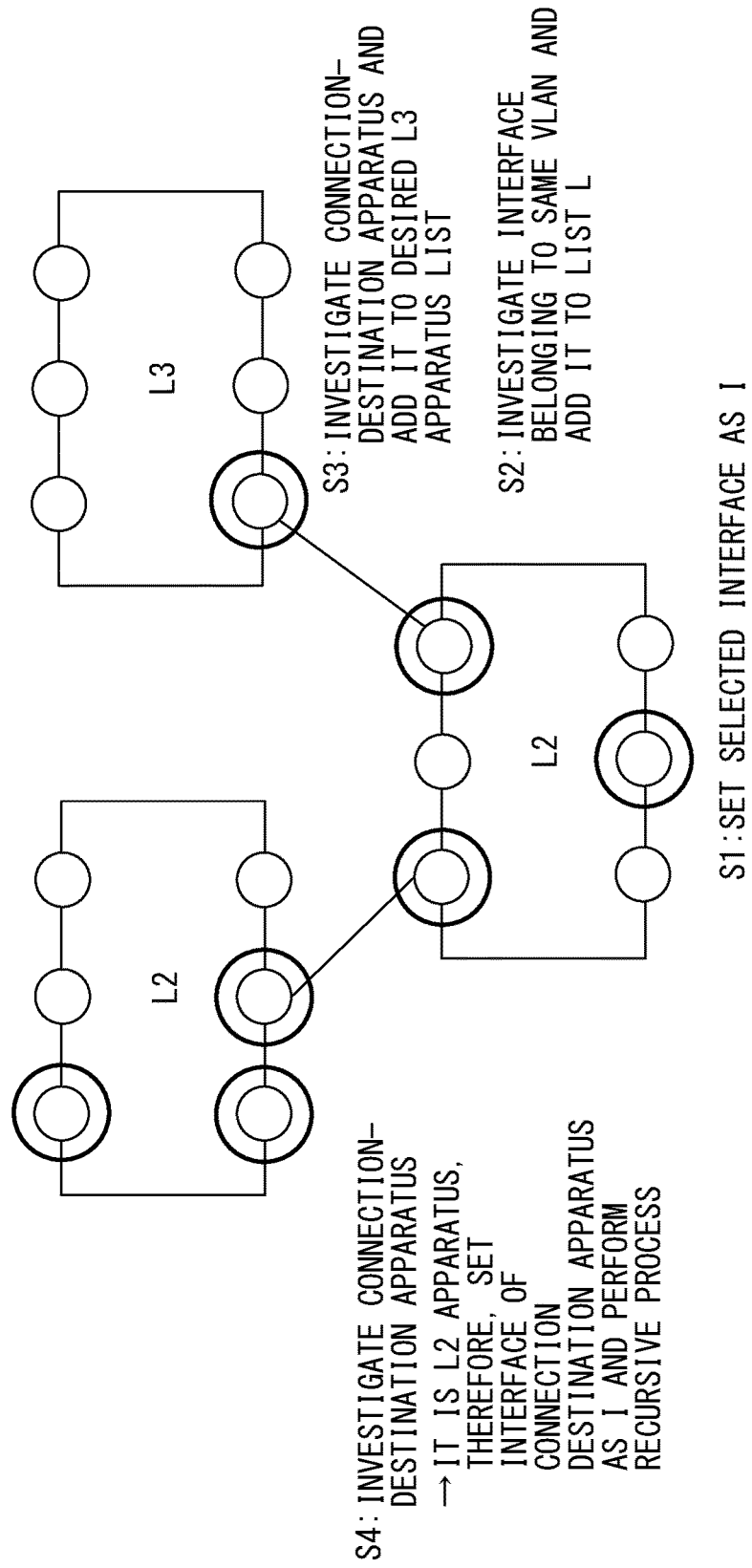
FIG. 8 is a diagram for explaining a method for identifying an L3 apparatus using VLAN information in an example of the present embodiment.

FIG. 8 is a diagram for explaining a method for identifying an L3 apparatus using VLAN information in an example of the present embodiment.

First, the SDN controller 25 sets the selected interface as I in the L2 apparatus specified by the user (S1). The SDN controller 25 investigates and adds to the list L, the interfaces that belong to the same VLAN as the selected interface I in the L2 apparatus (S2). Here, the interfaces added to the list L is the interfaces that belong to the same VLAN as the selected interface I, and that are interfaces of apparatuses displayed on the network configuration diagram.

The SDN controller 25 investigates another connection-destination apparatus of the investigation-target L2 apparatus. When the connection destination is an L3 apparatus, the SDN controller 25 adds the connection destination to the L3 apparatus list (S3). However, the L3 apparatus added to the L3 apparatus list is an apparatus that is displayed on the network configuration diagram.

The SDN controller 25 looks for other connection-destination apparatus of that L2 apparatus. When the connection-destination is an L2 apparatus, the SDN controller 25 adds the interface of the connection-destination as I, and performs a recursive process.

FIG. 9 illustrates the flow of a route display process in an example of the present embodiment. The input information obtaining unit 32 obtains the initially specified apparatus ID and the initially specified IF ID as interface information (input information) of the L2 apparatus specified by the user using the input apparatus 41. In addition, the input information obtaining unit 32 obtains the destination IP address specified by the user using the input apparatus 41.

Then, the L3 apparatus identifying unit 33 inputs the initially specified apparatus ID into a parameter D, and inputs the initially specified IF ID into a parameter I (S11).

The L3 apparatus identifying unit 33 obtains the VLAN ID from the interface table 37 using the parameters D, I as the key. The L3 apparatus identifying unit 33 substitutes the obtained VLAN ID into a parameter V (S12).

The L3 apparatus identifying unit 33 calls a route search function while specifying arguments, and receives the return values (the route search list, the L3 apparatus list) (S13). For the route search function, the parameter D (Apparatus ID), the parameter I (IF ID), the parameter V (VLAN ID), the parameter T (intermediate route result), and the parameter R (L3 apparatus list) are specified as the arguments. As the initial values of the intermediate route result T, and the L3 apparatus list R NULL is specified for each. Details of the process in S13 is explained using FIG. 10.

Using the return values (the route search list, the L3 apparatus list) of the route search function, the destination searching unit 34 accesses each of the identified L3 apparatuses, refers to the routing table held by the L3 apparatus and the specified destination IP address, and accesses the next L3 apparatus. By repeating this, the destination searching unit 34 performs route search from each L3 apparatus to the destination IP address, for the respective L3 apparatuses that have been found (S14).

The display control unit 35 performs highlighted display for the searched route on the network configuration diagram displayed on the display apparatus 42 (S15). That is, highlighted display is performed by the display control unit 35 for the route from the specified L2 apparatus to the respective L3 apparatuses that have been identified, and the route from the respective L3 apparatuses to the apparatus that has the destination IP address.

Figure 10:
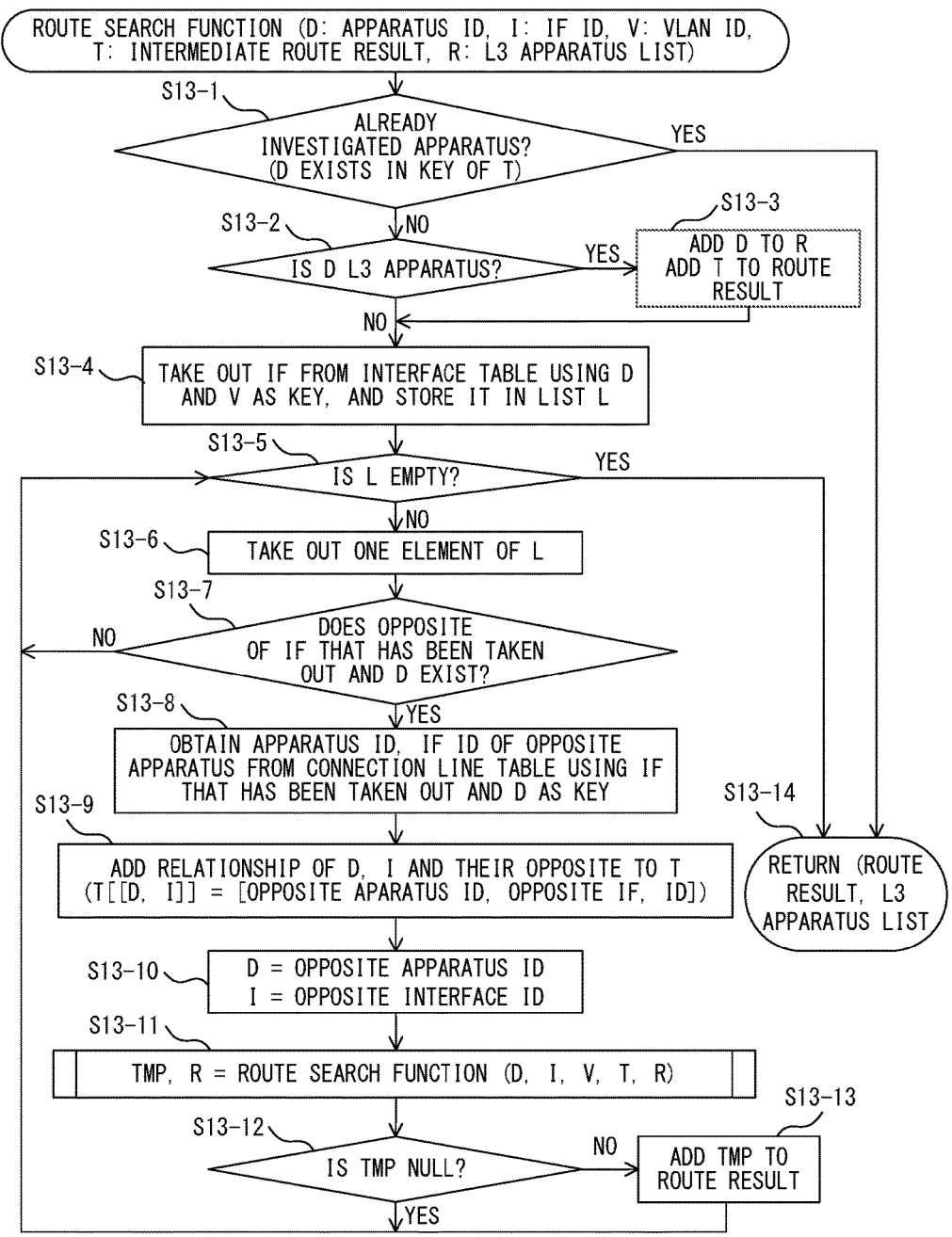
FIG. 10 illustrates the flow of a route search function in an example of the present embodiment.

FIG. 10 illustrates the flow of the route search function in an example of the present embodiment. The L3 apparatus identifying unit 33 determines whether the flow in FIG. 10 has been executed for the apparatus corresponding to the apparatus ID that has been input to the apparatus ID D. Here, the L3 apparatus identifying unit 33 determines whether the apparatus ID D exists in the intermediate route result T (S13-1).

In the case in which flow in FIG. 10 has been executed for the apparatus corresponding to the apparatus ID indicated by the apparatus ID D, that is, when the apparatus ID D exists in the intermediate route result T (S13-1, "YES"), the L3 apparatus identifying unit 33 performs the following process. That is, the L3 apparatus identifying unit 33 returns the route result and the L3 apparatus list as the return values (S13-13).

In the case in which the flow in FIG. 10 has not been executed for the apparatus indicated by the Apparatus ID D, that is, in the case in which no apparatus ID D exists in the intermediate route result T, (S13-1, "NO"), the L3 apparatus identifying unit 33 performs the following process. That is, the L3 apparatus identifying unit 33 refers to the apparatus table 38 using the apparatus ID D as the key, and determines whether the apparatus indicated by the apparatus ID D is an L3 apparatus (S13-2).

In the case in which the apparatus indicated by the apparatus ID D is an L3 apparatus (S13-2, "YES"), the L3 apparatus identifying unit 33 adds the apparatus ID D to the L3 apparatus list R. The L3 apparatus identifying unit 33 adds the intermediate route result T to the route result (S13-3).

In the case in which the apparatus indicated by the apparatus ID D is not an L3 apparatus (S13-2, "NO"), the L3 apparatus identifying unit 33 takes out an IF ID from the interface table 37 using the apparatus ID D and the VLAN ID V as the key, and stores it in the list L (S13-4).

The L3 apparatus identifying unit 33 determines whether the list L is empty (S13-5). When the list L is empty (S13-5, "YES"), the L3 apparatus identifying unit 33 returns the route result T and the L3 apparatus list R as the return values (S13-13).

When the list L is not empty (S13-5, "NO"), the L3 apparatus identifying unit 33 takes out one element of the list L (S13-6). The L3 apparatus identifying unit 33 refers to the connection line table 39 and determines whether there is an apparatus that is opposite to the apparatus ID D and the IF ID that has been taken out (S13-7). That is, the L3 apparatus identifying unit 33 determines whether there are an apparatus IF and an IF ID corresponding to the IF ID that has been taken out and the apparatus ID D, in "Origin Apparatus ID" and "Origin IF ID" of the connection line table 39.

In the case in which there are no apparatus ID and IF ID corresponding to the IF ID that has been taken out and the apparatus ID D in the connection line table 39 (S13-7, "NO"), the L3 apparatus identifying unit 33 return to the process in S13-5.

In the case in which there are an apparatus ID and an IF ID corresponding to the IF ID that has been taken out and the apparatus ID D in the connection line table 39 (S13-7, "YES"), the L3 apparatus identifying unit 33 performs the following process. That is, the L3 apparatus identifying unit 33 obtains the apparatus ID and the IF ID of the opposite apparatus from the connection line table 39, using the IF ID that has been taken out and the apparatus ID D as the key (S13-8).

The L3 apparatus identifying unit 33 adds the connection relationship of the apparatus ID D and IF ID I and with the apparatus that is opposite to that apparatus, to the intermediate route result T (T[[Apparatus ID D, IF ID I]]=[Opposite Apparatus ID, IF ID of the opposite apparatus]) (S13-9).

The L3 apparatus identifying unit 33 substitutes the apparatus ID of the opposite apparatus into D and the IF ID of the opposite apparatus into I (S13-10).

The L3 apparatus identifying unit 33 calls the route search function while specifying arguments, and receives the return values (a route search list TMP, the L3 apparatus list R) (S13). For the route search function, the parameter D (Apparatus ID), the parameter I (IF ID), the parameter V (VLAN ID), the parameter T (intermediate route result), the parameter R (the L3 apparatus list) are specified as the arguments. Accordingly, the route search function in FIG. 10 is recursively performed.

The L3 apparatus identifying unit 33 determines whether the route search list TMP is NULL (S13-12). When the route search list TMP is not NULL (S13-12, "NO"), the L3 apparatus identifying unit 33 adds the route search list TMP to the route result (S13-13).

When the route search list TMP is NULL (S13-12, "YES"), the L3 apparatus identifying unit 33 returns to the process in S13-5.

According to the flow in FIG. 10, by adding, to the L3 apparatus list, the L3 apparatuses of the network to which L2 apparatus belongs, all the L3 apparatuses of the network to which the L2 apparatus belongs may be identified.

Figure 11:
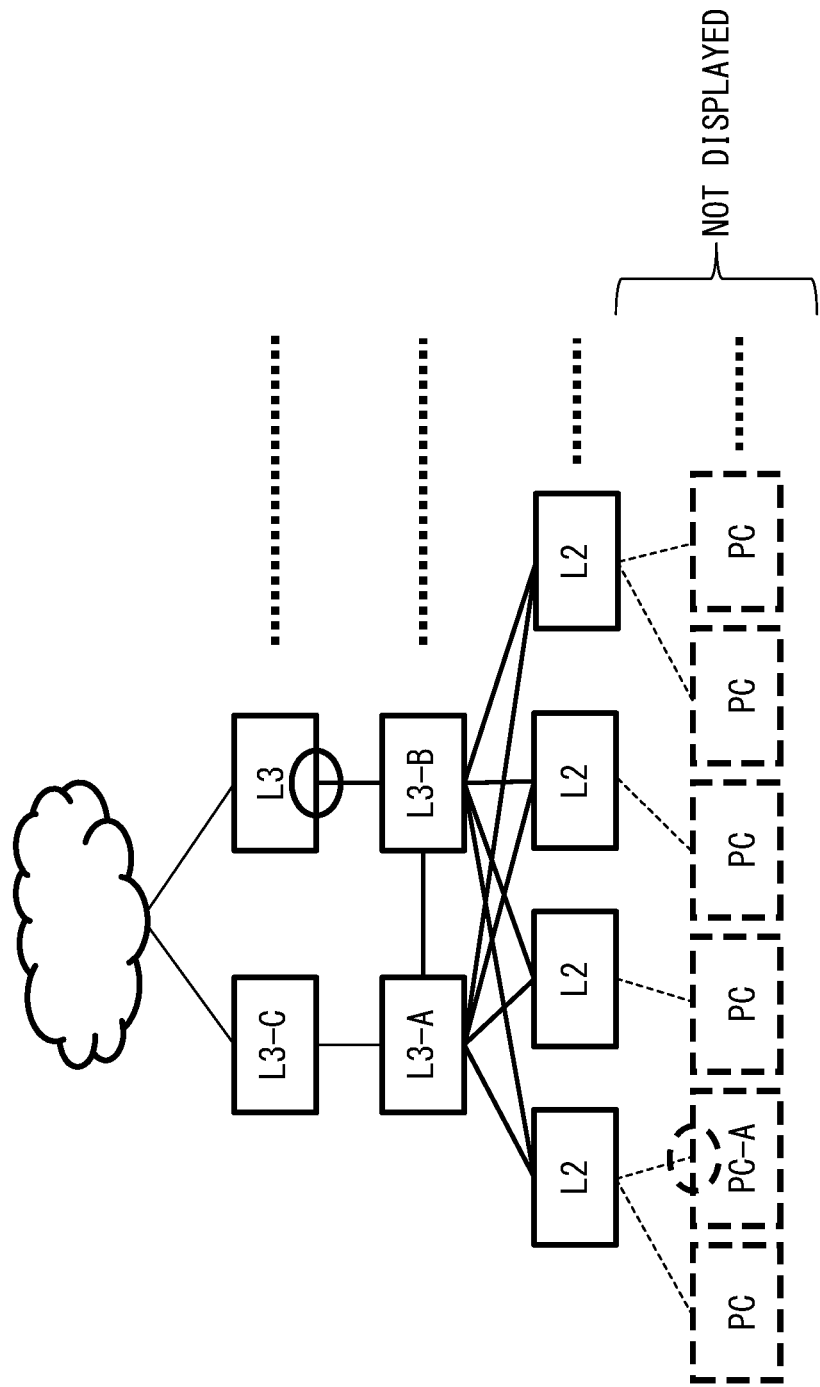
FIG. 11 is a diagram for explaining the route display from a L3 apparatus that has been found to a destination L3 apparatus in an example of the present embodiment.

FIG. 11 is a diagram for explaining the route display from the L3 apparatuses that have been found to the destination L3 apparatus in an example of the present embodiment. After the L3 apparatuses are found, the destination searching unit 34 performs a route search from each L3 apparatus to the destination IP address, for the respective L3 apparatuses that have been found. Then, the display control unit 35 displays the route search results obtained for the respective L3 apparatuses together, on the display apparatus 42 (that is, unnecessary routes are also displayed).

However, when the L3 apparatus that becomes the next forwarding destination of the L3 apparatus that has been found is included in an L3 apparatuses that have been found, and is reached by passing through the same network as the network used in finding the L3 apparatus, the display control unit 35 does not display it. For example, when the next forwarding destination of L3-A is L3-B as illustrated in FIG. 11, the display control unit 35 does not display the route search result for L3-A.

Figure 12:
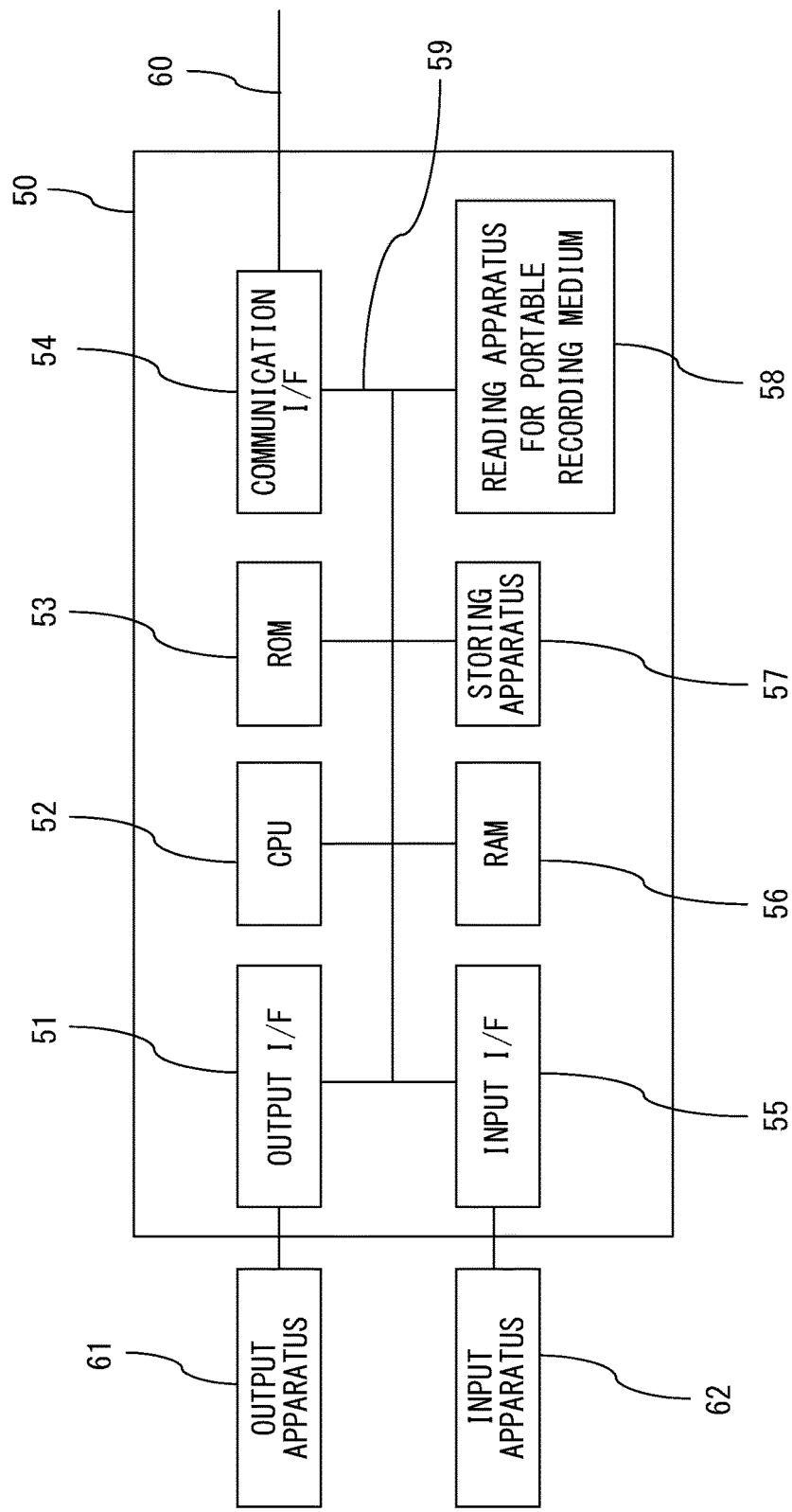
FIG. 12 is an example of a configuration block diagram of the hardware environment of a computer that executes a program in the present embodiment.

FIG. 12 is an example of the configuration block diagram for the hardware environment of the computer that executes the program in the present embodiment. A computer 50 functions as the route display apparatus 1 or the SDN controller 25. The computer 50 is constituted by a CPU 52, a ROM 53, a RAM 56, a communication I/F 54, a storing apparatus 57, an output I/F 51, an input I/F 55, a reading apparatus 58, a bus 59, an output apparatus 61, and an input apparatus 62.

Here, the CPU represents a central processing apparatus. The ROM represents a read-only memory. The RAM represents a random-access memory. The I/F represents an interface. The CPU 52, ROM 53, the RAM 56, the commmunication I/F 54, the storing apparatus 57, the output I/F 51, the input I/F 55, and the reading apparatus 58 are connected to the bus 59. The reading apparatus 58 is an apparatus that reads a portable recording medium. The output apparatus 61 is connected to the output I/F 51. The input apparatus 62 is connected to the input I/F 55.

As the storing apparatus 57, storing apparatuses in various formats, such as a hard disk, a flash memory, a magnetic disk, and the like may be used. The storing apparatus 57 or the ROM 53 stores a program according to the present embodiment that makes the CPU 52 function as the obtaining unit 2, the identifying unit 3, the display control unit 4, the destination searching unit 5, more specifically, the input information obtaining unit 32, the L3 apparatus identifying unit 33, the destination searching unit 34, the display control unit 35. In addition, the storing apparatus 57 stores the interface table 37, the apparatus table 38, the connection line table 39, and the like. The RAM 56 temporarily stores information.

The CPU 52 reads the program according to the present embodiment from the storing apparatus 57 or the ROM 53 and executes the program, as the control unit 22.

The communication I/F 54 is an interface such as a port or the like for connecting to the network to communicate with other apparatuses.

The program that realizes the processes explained in the embodiment described above may be stored in the storing apparatus 57, for example, from the program provider side through a communication network 60 and the communication I/F 54. In addition, the program that realizes the processes explained in the embodiment described above may also be stored in a portable storage medium that is commercially sold and distributed. In this case, the portable storage medium may be set into the reading apparatus 58, and the program may be read and executed by the CPU 52. As the portable storage medium, storage media in various formats, such as a CD-ROM, a flexible disk, an optical disk, a magneto-optical disk, an IC card, a USB memory apparatus, a semiconductor memory card and the like may be used. The program stored in such a storage medium is read by the reading apparatus 58.

A keyboard, a mouse, a digital camera, a web camera, a microphone, a scanner, a sensor, a tablet, a touch panel, and the like may be used as the input apparatus 62. Meanwhile, a display, a printer, a speaker, and the like may be used as the output apparatus 61.

The network 60 is connected to the business network 21. The network 60 may be a communication network such as the Internet, LAN, WAN, a dedicated line, wired, wireless, and the like.

According to the present embodiment, by making it possible to select the interface of an L2 apparatus connected to an L3 apparatus at the end, a route that is equivalent to the one in the case in which the L3 apparatus at the end is selected may be displayed. In this case, when the L2 apparatus is selected, the gateway address of the network to which the L2 apparatus belongs may still be recognized. As a result, L3 information may be derived from the L2 apparatus that does not have L3 information. In addition, convenience for the administrator increases since the registration of devices at the end is no longer needed even in a complicated network environment. In addition, according to the route display function, it becomes easier to identify a point at which a communication failure is occurring, and a prompt collection may be realized.

Meanwhile, the present invention is not limited to the embodiment described above, and may take various configurations and embodiments without departing from the gist of the present invention.

According to the embodiment described above, in displaying a virtualized network configuration, it becomes possible to display a route from an L2 apparatus connected to an apparatus that is not selectable.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A route display method comprising:
    accepting, by a processor, an input for selecting a first interface provided at a layer 2 (L2) apparatus that relays communication according to a protocol used in a datalink layer, among a plurality of apparatuses included in a virtual network displayed on a display apparatus;
    accepting, by the processor, an input specifying an Internet Protocol (IP) address of a route-search-target apparatus;
    identifying from among the plurality of apparatuses, by the processor using a virtual local area network identifier (VLAN ID) of the interface of the L2 apparatus selected, a layer 3 (L3) apparatus that relays communication according to a protocol used in a network layer and has the VLAN ID of the first interface of the L2 apparatus, by;
    identify, by the processor, a second interface that belongs to a same network as the first interface, according to network information that indicates networks to which interfaces of the plurality of apparatuses belong;
    identifying, by the processor, an apparatus that is connected to the second interface, according to connection information between the plurality of apparatuses; and
    determining, by the processor, whether the identified apparatus is the L3 apparatus, according to type information of the plurality of apparatuses;
    obtaining, by the processor, a gateway address that corresponds to the IP address from a routing table of the layer 3 apparatus identified;
    performing, by the processor using the gateway address, a search of a route to the route-search-target apparatus; and
    displaying, by the processor, the route determined in the search that is a route from the L2 apparatus via the L3 apparatus to the route-search-target apparatus.

2. A non-transitory computer-readable recording medium having stored therein a route display program executable by a CPU/processor for causing a computer to execute a process, the process comprising:
    accepting an input for selecting a first interface provided at a layer 2 (L2) apparatus that relays communication according to a protocol used in a datalink layer, among a plurality of apparatuses included in a virtual network displayed on a display apparatus;
    accepting an input specifying Internet Protocol (IP) address of a route-search-target apparatus;
    identifying, from among the plurality of apparatuses using a virtual local area network identifier (VLAN ID) of the interface of the L2 apparatus selected, a layer 3 (L3) apparatus that relays communication according to a protocol used in a network layer and has the VLAN ID of the first interface of the L2 apparatus, by;
    identifying, by the processor, a second interface that belongs to a same network as the first interface, according to network information that indicates networks to which interfaces of the plurality of apparatuses belong;
    identifying, by the processor, an apparatus that is connected to the second interface, according to connection information between the plurality of apparatuses; and
    determining, by the processor, whether the identified apparatus is the L3 apparatus, according to type information of the plurality of apparatuses;
    obtaining a gateway address that corresponds to the IP address from a routing table of the layer 3 apparatus identified;
    performing a search of a route to the route-search-target apparatus using the gateway address; and
    displaying the route determined in the search that connects the L2 apparatus to the route-search-target apparatus via the L3 apparatus.

3. A route display apparatus comprising:
    a memory; and
    a processor that executes a process stored in the memory, including:
    accepting an input for selecting a first interface provided at a layer 2 (L2) apparatus that relays communication according to a protocol used in a datalink layer, among a plurality of apparatuses included in a virtual network displayed on a display apparatus;
    accepting an input specifying an Internet Protocol (IP) address of a route-search-target apparatus;
    identifying, from among the plurality of apparatuses using a virtual local area network identifier (VLAN ID) of the interface of the L2 apparatus selected, a layer 3 (L3) apparatus that relays communication according to a protocol used in a network layer and has the VLAN ID of the first interface of the L2 apparatus, by;
    identifying, by the processor, a second interface that belongs to a sane network as the first interface, according to network information that indicates networks to which interfaces of the plurality of apparatuses belong;

identifying, by the processor, an apparatus that is connected to the second interface, according to connection information between the plurality of apparatuses; and determining, by the processor, whether the identified apparatus is the L3 apparatus, according to type information of the plurality of apparatuses;

obtaining a gateway address that corresponds to the IP address from a routing table of the layer 3 apparatus identified;

performing a search of a route to the route-search-target apparatus using the gateway address; and displaying the route determined in the search that connects the L2 apparatus to the route-search-target apparatus via the L3 apparatus.

* * * * *